United States Patent
Vauchel (10) Patent No.: US 9,115,668 B2
(45) Date of Patent: Aug. 25, 2015

(54) THRUST REVERSAL DEVICE

(75) Inventor: Guy Bernard Vauchel, Harfleur (FR)

(73) Assignee: AIRCELLE, Gonfreville l'Orcher (FR)

( * ) Notice: Subject to any disclaimer, the term of this patent is extended or adjusted under 35 U.S.C. 154(b) by 734 days.

(21) Appl. No.: 13/390,385

(22) PCT Filed: Jul. 15, 2010

(86) PCT No.: PCT/FR2010/051490
§ 371 (c)(1),
(2), (4) Date: Feb. 14, 2012

(87) PCT Pub. No.: WO2011/018569
PCT Pub. Date: Feb. 17, 2011

(65) Prior Publication Data
US 2012/0138707 A1  Jun. 7, 2012

(30) Foreign Application Priority Data
Aug. 14, 2009 (FR) .................................. 09 03975

(51) Int. Cl.
*F02K 1/72* (2006.01)
*F02K 1/76* (2006.01)

(52) U.S. Cl.
CPC .. *F02K 1/763* (2013.01); *F02K 1/72* (2013.01)

(58) Field of Classification Search
CPC ............. F02K 1/72; F02K 1/763; F02K 1/76; F02K 1/09; F02K 1/54; F02K 1/64
USPC .................. 60/226.2, 226.1, 770, 771, 226.3; 239/265.11–265.43
See application file for complete search history.

(56) References Cited

U.S. PATENT DOCUMENTS

| | | | | |
|---|---|---|---|---|
| 3,500,644 A | * | 3/1970 | Hom et al. .................... | 60/229 |
| 3,500,646 A | | 3/1970 | Hom et al. | |
| 3,612,399 A | * | 10/1971 | Rodgers et al. .......... | 239/265.19 |
| 3,655,134 A | * | 4/1972 | Greenland et al. ....... | 239/265.37 |
| 4,005,822 A | | 2/1977 | Timms | |
| 4,147,028 A | * | 4/1979 | Rodgers ...................... | 60/226.2 |

(Continued)

FOREIGN PATENT DOCUMENTS

| | | |
|---|---|---|
| EP | 0109219 A2 | 5/1984 |
| EP | 0488453 A1 | 6/1992 |

(Continued)

OTHER PUBLICATIONS

A.F. Krainev Glossary on machinery, Moscow, "Mashinostroenie", 1987, p. 48, scheme a) (Russian language).

(Continued)

*Primary Examiner* — Phutthiwat Wongwian
*Assistant Examiner* — Steven Sutherland
(74) *Attorney, Agent, or Firm* — Brinks Gilson & Lione (57) ABSTRACT

The present invention relates to a thrust reversal device (1) for a turbojet engine nacelle, characterized in that: (i) the movable cowl (3) is provided with at least one driving lead screw (30) having at least one peripheral groove over at least part of the length thereof, whereby said groove can engage with a stationary guide means (31) of the nacelle so as to rotate the lead screw during the translational movement of the movable cowl; and (ii) the lead screw is associated with at least one means for transmitting (32, 35, 36) the rotational movement thereof towards at least one drive system (33, 34, 25) of the flap.

16 Claims, 4 Drawing Sheets

(56) References Cited

U.S. PATENT DOCUMENTS

| | | | |
|---|---|---|---|
| 4,216,909 A | * | 8/1980 | Carlin ............... 239/265.31 |
| 4,356,973 A | | 11/1982 | Lawson |
| 6,786,039 B2 | * | 9/2004 | Chakkera et al. ........... 60/226.2 |

FOREIGN PATENT DOCUMENTS

| | | |
|---|---|---|
| EP | 1239139 A1 | 9/2002 |
| FR | 1267639 A | 7/1961 |
| GB | 2045179 A | 10/1980 |
| RU | 2 315 887 | 1/2008 |
| WO | 2008/049986 A1 | 5/2008 |

OTHER PUBLICATIONS

International Search Report issued Feb. 10, 2011 by European Patent Office Re: PCT/FR2010/051490: citing: US 4,005,822 A, US 4,356,973 A, EP 0 109 219 A2, GB 2 045 179 A, EP 1 239 139 A1, EP 0 488 453 A1 and FR 1 267 639 A.

* cited by examiner

THRUST REVERSAL DEVICE

TECHNICAL FIELD

The invention relates to a thrust reverser, called a grid reverser or a cascade reverser, for a jet engine.

BRIEF DISCUSSION OF RELATED ART

An airplane is moved by several turbojet engines each housed in a nacelle also housing a set of related actuating devices relative to its operation and performing various functions when the turbojet engine is running or stopped. These related actuating devices in particular comprise the mechanical thrust reversal system.

A nacelle generally has a tubular structure comprising an air intake upstream of the turbojet engine, a middle section intended to surround a fan of the turbojet engine, a downstream section housing the thrust reversal means and intended to surround the combustion chamber of the turbojet engine, and generally ends with a jet nozzle whereof the outlet is situated downstream of the turbojet engine.

Modern nacelles are intended to house a dual-flow turbojet engine capable of generating, via the rotating blades of the fan, a hot air flow (also called primary flow, coming from the combustion chamber of the turbojet engine, and a cold air flow (secondary flow) that circulates outside the turbojet engine through an annular passage, also called a tunnel, formed between a fairing of the turbojet engine and an inner wall of the nacelle. The two flows of air are discharged from the turbojet engine through the back of the nacelle.

The role of the thrust reverser is, during the landing of an airplane, to improve the braking capacity thereof by reorienting at least part of the thrust generated by the turbojet engine forward. In this phase, the reverser obstructs the tunnel of the cold flow and orients the latter toward the front of the nacelle, thereby generating a counter-thrust that is added to the braking of the airplane's wheels.

The means implemented to perform this reorientation of the cold flow vary depending on the type of reverser. However, in all cases, the structure of a reverser comprises mobile cowls that can be moved between a deployed position in which they open a passage in the nacelle intended for the deflected flow on the one hand, and a retracted position in which they close said passage on the other hand. These cowls can perform a bypass function or simply a function activating another bypass means.

In the case of the grid reverser, also known as a cascade reverser, the reorientation of the flow of air is done by cascade vanes, the cowl only having a simple sliding function intended to expose or cover said vanes. Complementary blocking doors, also called flaps, activated by the sliding of the cowling, generally make it possible to close the tunnel downstream of the vanes so as to optimize the reorientation of the cold flow.

These flaps are pivotably mounted, by a downstream end, on the cowl sliding between a retracted position in which they ensure, with said mobile cowl, the aerodynamic continuity of the inner wall of the nacelle, and a deployed position in which, in a thrust reversal situation, they at least partially obstruct the annular channel so as to deflect a flow of gas toward the cascade vanes exposed by the sliding of the mobile cowl. The pivoting of the flaps is guided by connecting rods attached to the flap on the one hand, and to a stationary point of the inner structure defining the annular channel on the other hand.

Such a configuration of the prior art has several problems, in particular problems of different opening kinetics between the translation of the cowling and the pivoting of the flaps, aerodynamic problems due to the guide connecting rods passing through the tunnel, acoustic performance problems due to the installation of stationary articulation points that reduce the surface of the inner structure that can be used for acoustic treatment, and mechanical problems due to the mechanical connection using the connecting rods between the thrust reverser and the inner structure.

The issue of managing the total surface for passage of the air is a particularly important point. In fact, during a transition phase between the opening and closing of the thrust reverser, there is often a sensitive kinematic point that places the flap in the position partially obstructing the annular channel without the obstructed section being completely compensated by the upstream section exposed by the withdrawal of the mobile cowl, making the management of the motor delicate during that phase.

Application WO 2008/049986 aims to offset most of these problems, and to that end proposes a reverser architecture no longer comprising connecting rods passing through the tunnel.

Application WO 2008/049986 achieves this goal by providing a slide driving the flap movably mounted inside the outer structure housing the thrust reverser.

It appears, however, that the device presented in document WO 2008/049986 can be further improved by overcoming certain deficiencies.

More specifically, a device according to the first embodiment described in document WO 2008/049986 requires the use of one cylinder per flap, which involves limiting the number of flaps as much as possible. Furthermore, the presence of cylinders distributed around the periphery of the structure can greatly hinder, or even prevent access to the engine body by opening the cowl structure surrounding the engine. This makes maintenance operations more complex, difficult, and lengthy.

A device according to the second embodiment described in document WO 2008/049986, and using radial slides driving the flaps, has insufficiencies in terms of mechanical reliability. In fact, its control and driving system is positioned on the mobile outer structure, which must be powered and synchronized during maneuvering of the outer structure.

Consequently, there is a need to improve a thrust reversal device without connecting rods in the tunnel so as to offset the limitations previously mentioned.

BRIEF SUMMARY

To that end, the present invention relates to a thrust reverser device for a turbojet engine nacelle comprising means for deflecting at least part of a flow of air from the turbojet engine on the one hand, and at least one cowl translatable in a direction substantially parallel to a longitudinal axis of the nacelle and having at least one flap pivotably mounted by one end on the mobile cowl on the other hand, said mobile cowl being able to go alternatingly from a closing position in which it ensures, the flap being in the retracted position, the aerodynamic continuity of the nacelle and covers the bypass means, to an opening position in which it opens a passage in the nacelle and exposes the bypass means, the flap being in a pivoted position in which it is capable of covering part of an annular channel of the nacelle, characterized in that, on the one hand, the mobile cowl is equipped with at least one driving lead screw having at least one groove over at least part of the length thereof, whereby said groove can engage with a stationary guide means of the nacelle so as to rotate the lead screw during the translational movement of the movable cowl, and on the other hand, in that the lead screw is associated with at least one means for transmitting the rotational movement thereof towards at least one drive system of the flap.

Using a device according to the invention, the lead screw fastened to the mobile cowl is driven simultaneously in translation with the latter. The groove of the lead screw, cooperating with the stationary complementary guide means, makes it possible to convert the translational movement of the screw into a rotational movement, said rotational movement then being sent back to actuate the actuating means of the blocking flaps.

Thus, owing to the invention, it is possible to implement a thrust reversal device without connecting rods in the secondary tunnel, and having a reliable system for driving the blocking flaps, that is simpler and lighter, resolving the problems raised above.

Furthermore, as will emerge from the continuation of the application, such a device allows easy steering of the flaps and does not prevent its application to a reverser structure incorporating a variable jet nozzle structure.

According to a first alternative embodiment, the lead screw has a helical groove with a constant pitch.

According to a second alternative, the lead screw has a helical groove with a variable pitch.

Advantageously, the lead screw has a helical groove with a reversible pitch, i.e. translating the lead screw rotates it and reciprocally, rotating the lead screw will translate it.

Preferably, the lead screw has a double helical groove, preferably symmetrical. This allows better rotational guiding of the lead screw.

According to one particular embodiment of the invention, the helical groove of the lead screw comprises a backlash portion at the beginning of opening of the mobile cowl. This makes it possible to adapt the kinematics of the blocking flaps and to only begin their deployment if the mobile cowl is open enough to avoid an accumulation of air and an overpressure in the tunnel during these transitional opening and closing phases of the reverser cowls in particular.

Preferably, the movement transmission system comprises at least one flexible transmission cable. Thus, the transmission system using flexible cables can easily be housed in a nacelle and adapt to the substantially cylindrical shape thereof.

Advantageously, the movement transmission system comprises at least one transfer gearbox.

Advantageously, the movement transmission system comprises at least one movement speed increaser and/or one movement reduction gear positioned between the lead screw and the driven system.

Of course, the reduction and/or multiplication ratios can be different from one another.

Preferably, the flap is attached to the mobile cowl by its downstream end.

Advantageously, the drive system of the flap has an irreversible pitch.

Preferably, the drive system of the flap comprises at least one connecting rod associated with at least one drive axis of one end of the connecting rod and capable of being rotated by the transmission means.

According to one alternative embodiment, the device comprises a braking system of the lead screw in the guide means. Such a system in particular allows precise control of the deployment kinematics of the flaps. In fact, when the brake guide is engaged, the lead screw is blocked in rotation. As a result, the mobile cowl and the lead screw translate, but the guide means does not convert the translational movement into a rotational movement. The flaps are therefore not actuated. Monitoring and control electronics can actuate the engagement of the brake in the guide means. The guide means are then engaged and allow the conversion of the translational movement into a rotational movement, which actuates the flaps.

In this way, it is possible to precisely control and optimize the evacuation curve of the flow of air during an opening or closing transition phase, rather than adapting the rating, so as to reduce or even cancel out the aerodynamic disruptions and power losses typical during these operating phases of the turbojet engine.

Preferably, the rotational guiding means of the lead screw are positioned in a front frame of the reverser.

Advantageously, the driving system for the lead screw and the flaps is situated below a sealing membrane of the mobile cowl, said diaphragm also preferably comprising upstream sealing means with the front frame.

In this way, the sealing of the system in the closed position is not disrupted and remains optimal.

Preferably, the driving device for the lead screw and/or the guiding means are positioned substantially in the 12 o'clock area.

According to one preferred embodiment of the invention, the thrust reverser device comprises two mobile cowls.

Complementarily, the thrust reversal device is equipped with a variable jet nozzle device.

Alternatively, the lead screw assumes the form of the toothed wheel, the guide means assuming the form of a rack. In fact, cooperation by the lead screw, guide means, refers to a system that allows the conversion of a translational movement of the mobile cowl into a rotational movement that can be transmitted to a mechanical driving device. A rack/toothed wheel system constitutes one such system equivalent to a lead screw/guide means system, the toothed wheel being translated with the mobile cowl, the rack converting that movement into a rotation of the toothed wheel.

According to another alternative embodiment, the lead screw assumes the form of a serrated rod, the stationary guide system being of the toothed wheel or complementary serrated sheath type capable of being rotated, in particular by a motor, so as to rotate the serrated rod.

BRIEF DESCRIPTION OF THE DRAWINGS

The invention will be better understood upon reading the detailed description that follows, in light of the appended drawings, in which.

DETAILED DESCRIPTION

Figure 1:
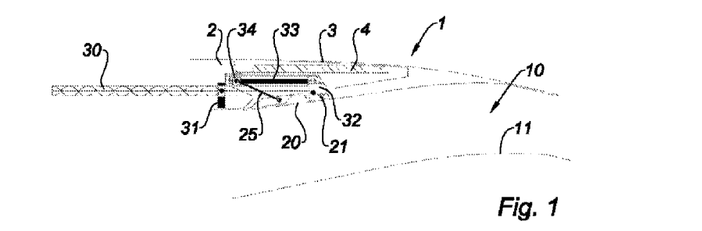
FIG. 1 is a diagrammatic illustration in longitudinal cross-section of a first embodiment of the invention.

In a known manner, the thrust reverser 1 shown in FIG. 1 is associated with a dual-flow turbojet engine (not shown) and belongs to an external nacelle that defines, with a concentric inner structure 11, an annular flow channel 10 (also called tunnel) of a secondary flow of the turbojet engine.

The thrust reversal device comprises a stationary front frame 2 extended by a cowl 3 slidably longitudinally mounted.

More specifically, it will be noted that a thrust reversal device generally comprises at least two substantially semi-cylindrical mobile cowls 3 mounted on the nacelle so as to be able to slide along guideways (not shown).

The front frame 2 supports a plurality of cascade vanes 4 housed in the thickness of the mobile cowl 3 when the latter is in the closed position.

The translation of the mobile cowl 3 in the downstream direction of the nacelle releases an opening in the latter through which the secondary flow of the turbojet engine can at least partially escape, said flow portion being reoriented toward the front of the nacelle by the cascade vanes 4, thereby generating a counter-thrust capable of helping with the braking of the airplane.

In order to increase the secondary flow portion passing through the vanes, the thrust reversal device comprises a plurality of reverser flaps 20, distributed over the circumference of the cowl 3, and each pivotably mounted by a downstream end around the hinge pin 21, on the sliding cowl 2 between a retracted position in which the flap 20 closes the opening and ensures the inner aerodynamic continuity of the tunnel 10 and a deployed position in which, in a thrust reversal situation, it at least partially covers the annular channel 10 so as to deflect a gas flow toward the grid opening 4. A sealing device (not shown) is provided on the perimeter of each flap 20 so as to isolate the flow circulating in the annular channel 10 from the flow outside the nacelle.

It should be noted that most of the figures provided for examples show pivoting of the flap 20 by its downstream end. It is of course also possible to hinge the flap 20 upstream in the tunnel.

During the operation of the turbojet engine in direct thrust mode (see FIG. 1), the sliding cowl 3 forms all or part of a downstream portion of the nacelle, the flaps 20 than being retracted into the sliding cowl 3, which covers the grid opening 4.

The thrust reversal device 1 must therefore be equipped with a system allowing joint driving of the mobile cowl 3 and the flaps 20 using appropriate kinematics.

To that end, and according to the invention, the thrust reversal device comprises a lead screw 30 attached to the mobile cowl 3 capable of cooperating with a guide means 31 fastened in the front frame 2 via a peripheral groove causing its rotation during translation of the mobile cowl 3.

The lead screw 30 is complementarily associated with means for transmitting its rotational movement, in particular a transfer gearbox 32, capable of transmitting said rotational movement to a driving system of the flap 20.

More specifically, the driving system of the flap comprises a threaded screw 33 rotated and capable of translating a nut 34 to which to connecting rods 25 are attached, also attached to the flap 20.

Figure 2:
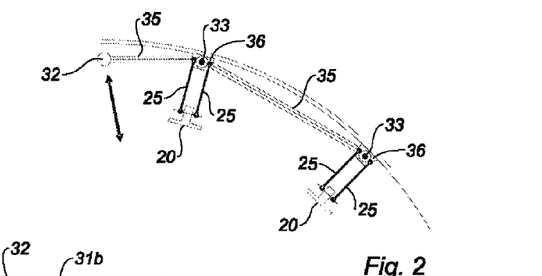
FIGS. 2 to 4 are detailed views of equipment of the device of FIG. 1.

As visible in FIG. 2, the rotational movement of the lead screw 30 is transmitted to each drive system of each flap 20 through flexible transmission cables 35 distributing the movement from the main transfer gearbox 32 to secondary transfer gearboxes 36 capable of rotating the corresponding threaded screw 33.

Of course, it is possible to provide rigid transmission axes if the latter remain in the available enclosure.

Figures 3, 4:
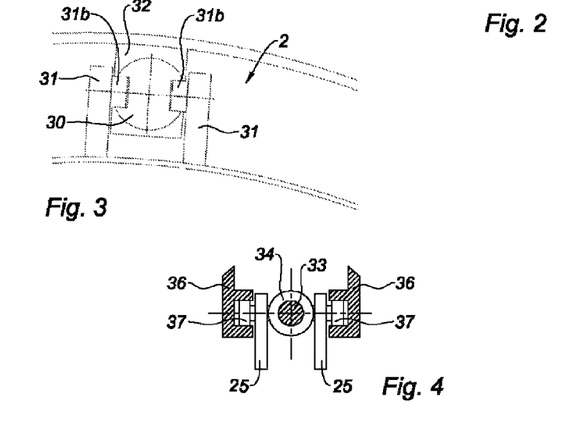

FIG. 3 shows the guide means 31 of the lead screw 30. The guide means 31 are mounted stationary on the front frame 2 and have two lateral branches each having a spur (or wheel) 31b capable of penetrating inside a slot of the lead screw 30. In this way, when the lead screw 30 translates, it is also rotated by the guide means 31.

FIG. 4 is a front view of the driving system of a flap 20. In addition to the screw 33 and the nut 34 driving the connecting rod 25, a guide and support system is provided comprising side rails 36 inside which wheels 37 connected to the nut 34 are inserted. The wheels thereby also make it possible to block the rotation of the nut 34.

FIGS. 5 to 8 show the different steps of opening the thrust reversal device 1.

Figure 5:
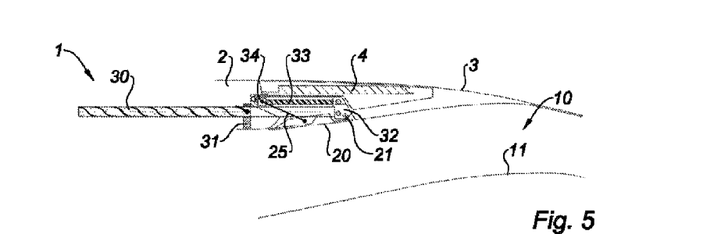
FIGS. 5 to 8 show the operating steps of the device of FIG. 1.

In FIG. 5, the mobile cowl 3 is closed. The thrust reversal device 1 is then in the so-called "direct jet" configuration.

When the opening of the thrust reversal device 1 is triggered, one or more actuators (not shown) translate the mobile cowl 3 in the downstream direction of the nacelle (FIGS. 2 to 7).

Figure 6:
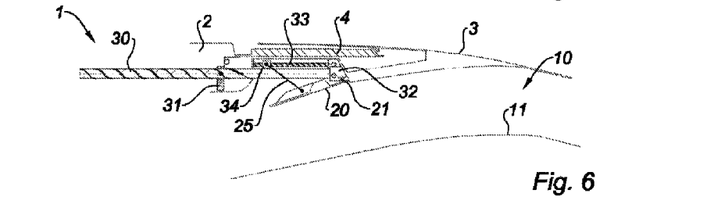
Figure 7:
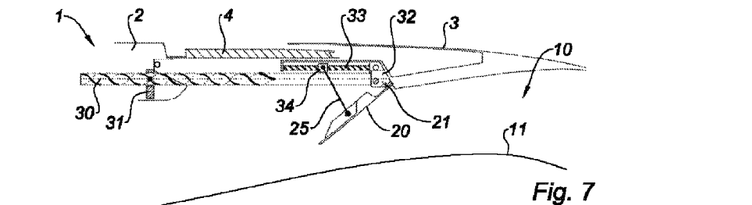
Figure 8:
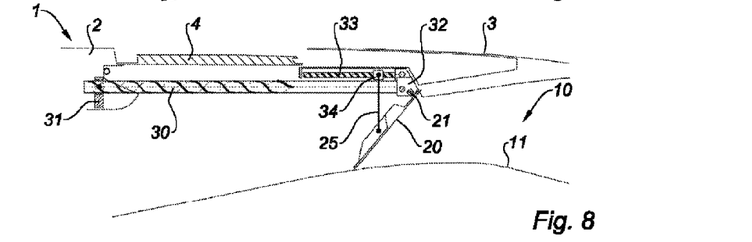

In so doing, the lead screw 30, attached to the cowl 3, is also translated in the downstream direction.

Under the effect of the cooperation of the groove of the lead screw 30 and the guide means 31, the lead screw 30 is rotated during that withdrawal.

The rotational movement of the lead screw 30 is transmitted to the flexible cables 35 via a primary return gearbox 32 and distributed to the drive system of the flaps 20, and more particularly to the threaded screws 33 via secondary transfer gearboxes 36 so as to rotate said threaded screws 33.

In so doing, the nut 34, blocked in rotation, withdraws along the threaded screw, causing, via the connecting rods 25, the flap 20 to pivot around its axis 21 until complete opening of the cowl 3 and blocking of the tunnel 10 by the flaps 20 (FIG. 7: reverse jet configuration).

Figure 9:
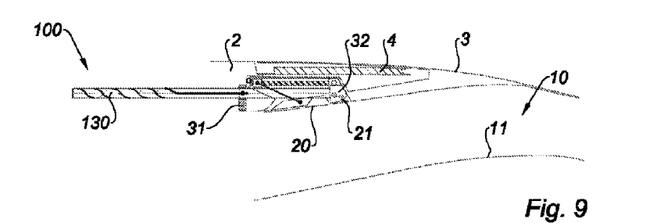
FIGS. 9 and 10 show a second embodiment of the invention.

FIG. 9 presents a thrust reversal device 100 according to the invention differing from a device 1 as shown in FIG. 1 in that it comprises a lead screw 130 having a backlash. More specifically, the groove of the lead screw 130 has a substantially straight initial portion which, consequently, does not rotate the screw as long as the guide means 31 cooperate with said portion of the screw.

Such an alternative makes it possible to adapt the opening kinematics of the flap 20 relative to those of the cowl 3, in particular by implementing a certain delay in the opening.

In fact, for certain turbojet engines, a simultaneous and immediate opening of the cowl 3 and the flaps 20 risks causing substantial pressure variations in the tunnel 10, which the turbojet engine will have to compensate by adapting its rating. This is generally harmful for the turbojet engine and causes needless overconsumption of fuel.

Figure 10:
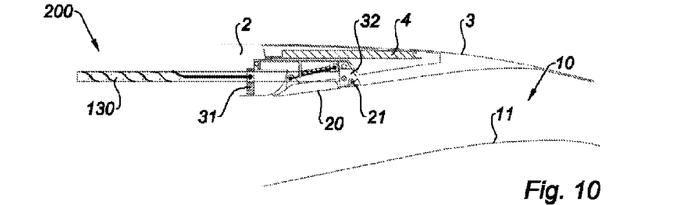

FIG. 10 shows a thrust reversal device 200 according to the invention differing from the preceding device 100 in that the articulation of the flaps 20 is reversed. More specifically, the embodiments of FIGS. 1 to 9 show flaps 20 pivoting in the opening position by translation of the nut 34 in the downstream direction of the nacelle. In the case at hand, in the thrust reversal device 200 of FIG. 10, the opening of the flaps 20 is done by translating the nut 34 in the upstream direction of the nacelle.

It should also be noted that advantageously, it is possible to assist the opening kinematics and reduce the driving lengths of the driving axes of the connecting rods 25 and the connecting rods 25 themselves by positioning said drive axis in a direction forming a more or less pronounced angle with the longitudinal axis of the nacelle. In this way, it will be easier to house the driving system of the flap 20 without having any interference with the upstream stationary structure 2.

Figure 11:
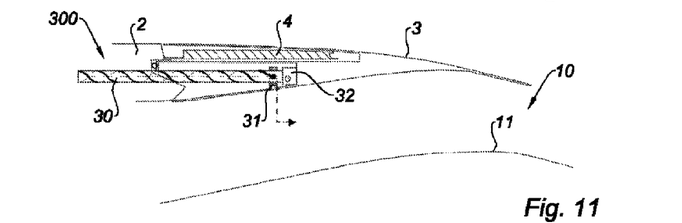
FIGS. 11 to 13 show a third, fourth and fifth embodiment of the invention.

FIG. 11 shows a thrust reversal device 300 according to the invention, differing from the preceding devices 1, 100, 200 in that the guide means 31 are fastened in a 12 o'clock beam area.

In fact, upstream of the front frame 2 is a fan case structure of the turbojet engine, and generally the suspension system of the engine is positioned in an upper area downstream of the fan case.

The suspension and lead screw systems 30 may therefore interfere with one another depending on the turbojet engine.

Installing the guide means in a 12 o'clock beam area makes it possible to position it further downstream, and therefore to reduce the upstream overhang of the lead screw 30.

The principle is therefore to attach the guide system 31 in the lateral portion of the thrust reversal device, as close as possible to the primary transfer gearbox 32.

The distance between the position in the front frame 2 and the downstream position thus defined is representative of the envelope value of the nacelle (upstream thickness) gained upstream of this stationary structure of the thrust reverser.

Figure 12:
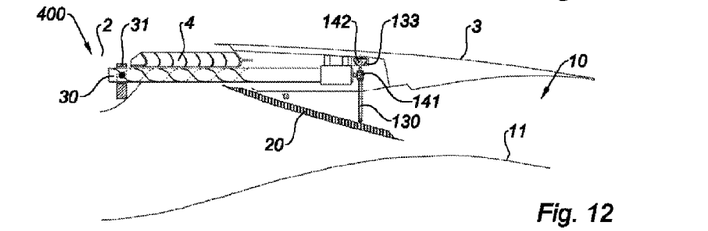

FIG. 12 shows still another alternative embodiment. A thrust reversal device according to FIG. 12 differs from the preceding devices primarily in that it is an adaptation of an embodiment presented in application WO 2008/049986.

In this embodiment, the flaps 20 are actuated by a driving slide 142 sliding inside a peripheral guideway 133, said slide 142 being connected via connecting rods 130 articulated to a plurality of flaps 20.

The driving slide 142 has a length portion equipped with a toothing (not visible) provided to mesh with a pinion 141 driven, rotating in a transverse plane of the sliding cowl 102, by the rotation of the lead screw 30. The movement of the slide 142 in its guideway 133 causes the connecting rods 130 and the flaps 20 to pivot toward the position covering the annular channel 10.

Figure 13:
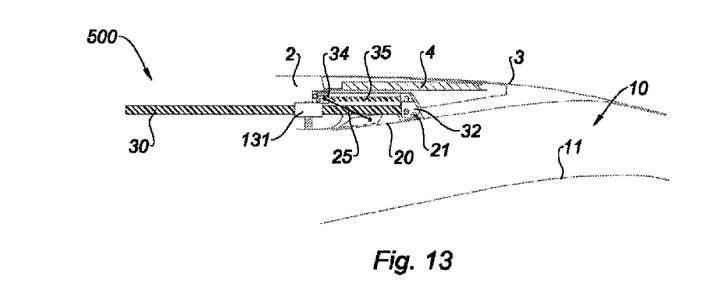

FIG. 13 shows a thrust reversal device 500 differing from a preceding device in that it comprises guide means 131 equipped with a braking system. The use of a braking guide system 131 makes it possible to switch the guide upon request between an engaged position in which it is engaged with the groove of the lead screw 30 and causes the rotation thereof, and a disengaged position in which it does not cooperate with the lead screw 30 and does not drive the rotation thereof. Such a device therefore makes it possible to very precisely steer the opening and closing kinematics of the flaps 20, in particular as a function of the pressure in the tunnel 10 during a movement phase of the mobile cowls 3 and the rating of the turbojet engine.

Figure 14:
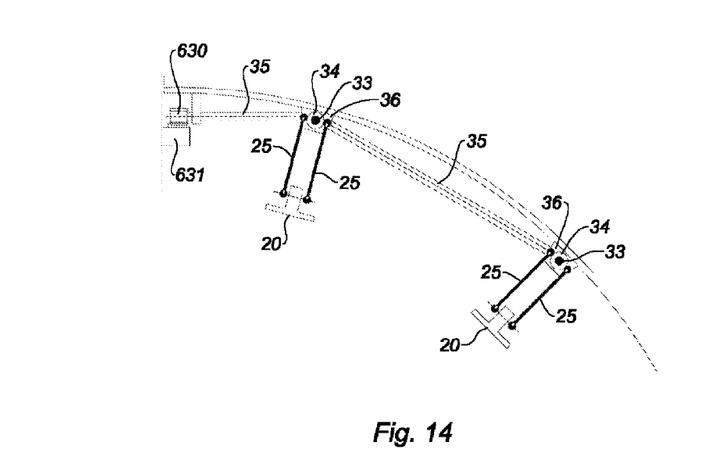
FIG. 14 shows an alternative embodiment of the driving system equipping a device according to the invention.

FIG. 14 shows an alternative embodiment of the drive system equipping a device according to the invention in which the lead screw assumes the form of a toothed wheel 630, the guide means assuming the form of a rack 631. In fact, lead screw, guide means cooperation refers to a system that allows the conversion of a translational movement of the mobile cowl into a rotational movement that can be transmitted to a mechanical drive device. A rack/toothed wheel system constitutes one such system equivalent to a lead screw/guide means system, the toothed wheel being translated with the mobile cowl, the rack transforming that movement into a rotation of the toothed wheel.

Other equivalent systems can of course be implemented, the term lead screw being understood generally by the means being translated with the mobile cowl, while the guide means generally refers to the stationary means converting the translational movement into rotational movement.

Although the invention has been described with one particular embodiment, it is of course in no way limited thereto and comprises all technical equivalents of the described means as well as combinations thereof if they are within the scope of the invention.

The invention claimed is:

1. A thrust reverser device for a turbojet engine nacelle comprising:
   means for deflecting at least part of a flow of air from the turbojet engine, and
   at least one cowl translatable in a direction substantially parallel to a longitudinal axis of the nacelle and having at least one flap pivotably mounted by one end on said at least one cowl,
   said at least one cowl configured to translate from a closing position in which said at least one cowl ensures an aerodynamic continuity of the nacelle with said at least one flap being in a retracted position and covers the deflecting means, to an opening position in which said at least one cowl opens a passage in the nacelle and exposes the deflecting means, said at least one flap being in a pivoted position in which the flap is capable of covering part of an annular channel of the nacelle,
   wherein said at least one cowl is equipped with at least one driving lead screw comprising over at least part of a length thereof a backlash portion and a helical groove portion, each portion engaging with a stationary guide means of the nacelle during translational movement of said at least one cowl, whereby said helical groove portion rotates said at least one driving lead screw and said backlash portion does not rotate said at least one driving lead screw so as to delay said opening of said at least one flap, and wherein said at least one driving lead screw is associated with at least one means for transmitting rotational movement thereof towards at least one drive system of said at least one flap.

2. The thrust reversal device according to claim 1, wherein the helical groove portion comprises a helical groove with a constant pitch.

3. The thrust reversal device according to claim 1, wherein the helical groove portion comprises a helical groove with a variable pitch.

4. The thrust reversal device according to claim 1, wherein the helical portion comprises a helical groove with a reversible pitch.

5. The thrust reversal device according to claim 1, wherein the helical portion comprises a symmetrical double helical groove.

6. The thrust reversal device according to claim 1, wherein a movement transmission system comprises at least one flexible transmission cable.

7. The thrust reversal device according to claim 1, wherein a movement transmission system comprises at least one transfer gearbox.

8. The thrust reversal device according to claim 1, wherein a movement transmission system comprises at least one movement speed increaser and/or one movement reduction gear positioned between said at least one driving lead screw and a driven system.

9. The thrust reversal device according to claim 1, wherein the flap is attached to said at least one cowl by a downstream end of the flap.

10. The thrust reversal device according to claim 1, wherein a drive system of the flap has an irreversible pitch.

11. The thrust reversal device according to claim 1, wherein a drive system of the flap comprises at least one connecting rod associated with at least one drive axis of one end of the connecting rod and capable of being rotated by transmission means.

12. The thrust reversal device according to claim 1, further comprising a braking system of the lead screw in the guide means.

13. The thrust reversal device according to claim 1, wherein the stationary guide means of said at least one driving lead screw are positioned in a front frame of the thrust reverser device.

14. The thrust reversal device according to claim 1, wherein a driving system for said at least one driving lead screw and flaps are situated below a sealing membrane of said at least one cowl.

15. The thrust reversal device according to claim 1, wherein a driving device for said at least one driving lead screw and/or the stationary guide means is positioned substantially in a 12 o'clock area.

16. The thrust reversal device according to claim 1, wherein the thrust reverser device comprises two mobile cowls.

\* \* \* \* \*